Aug. 21, 1962  J. M. STEVENS  3,050,426
VIBRATION ABSORBING MATERIAL AND METHOD FOR MAKING THE SAME
Filed Nov. 21, 1958
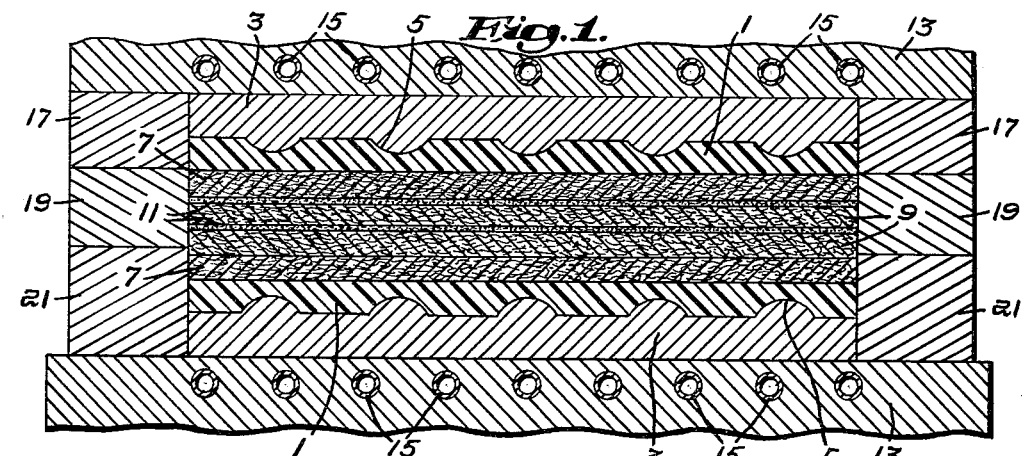
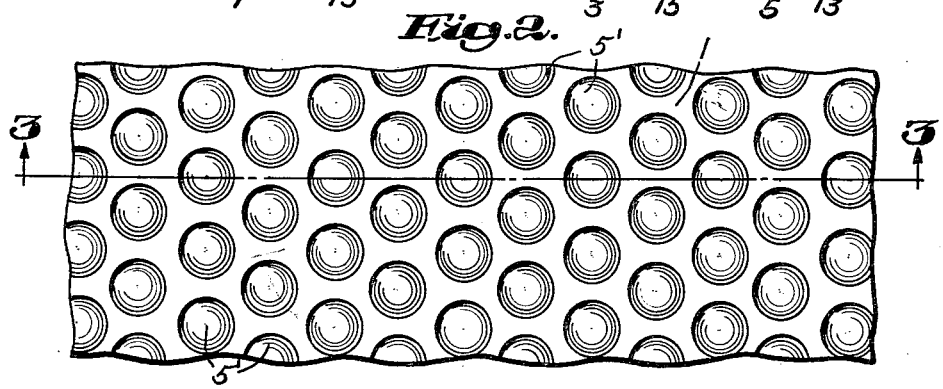
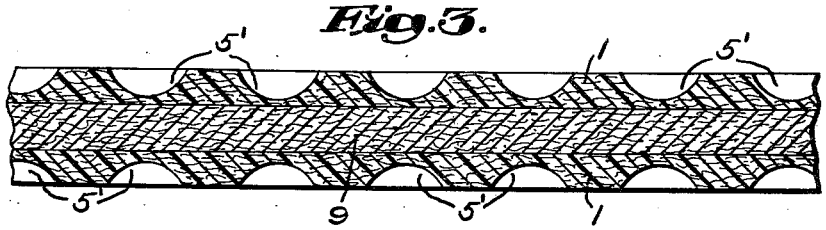
Inventor:
John Murray Stevens,
by Robert K. Randall,
Attorney

United States Patent Office 3,050,426
Patented Aug. 21, 1962

3,050,426
VIBRATION ABSORBING MATERIAL AND METHOD FOR MAKING THE SAME
John Murray Stevens, Franklin, Mass., assignor to H. F. Livermore Corporation, Allston, Mass., a corporation of Delaware
Filed Nov. 21, 1958, Ser. No. 775,538
10 Claims. (Cl. 154—54)

The present invention relates to vibration absorbing materials such as are used in supporting and mounting machines or parts thereof which in their operation create vibrations, the purpose of such use being to prevent the transmission of such vibrations to the floor or other parts of the building where the machine is used, or to other machines, or to other parts of the same machine creating the vibrations. The present is an improvement in the product and method of McDermott Patent 2,809,145, granted October 8, 1957. This material is commonly used in the form of pads placed beneath the legs, base, or other supporting portions of the machine and thus mounting or supporting the machine without contact of the latter with the floor or other parts of the building or adjacent objects.

The invention aims to provide a pad having superior ability to check the transmission of vibrations through it, by reducing the amplitude and intensity of the vibrations or otherwise, while capable of enduring heavy loads without acquiring a permanent set or compression such as disqualify rubber, felt, and many other substances for such use.

Most materials suitable for present purposes have a fundamental frequency of vibration which cannot be eliminated, and will pass this frequency through. Different densities of materials of course have different degrees of hardness which under vibration give different resistance to compression, and hence different deflection rates, which as in a spring determine the vibration period or frequency. The invention is based on the principle that if sheet materials unlike in these respects be superposed, the vibration periods are unlike, and the vibration which gets through one layer in significant amplitude is out of step with the fundamental frequency of the next layer, and therefore cannot get through in any substantial amplitude. If a third or more layers be added, each with a frequency dissimilar to its predecessor, the amplitude and intensity of the vibrations are still further reduced, to the desired point of practical elimination thereof.

The invention aims to provide a preferably unitary structure having co-extensive distinct layers or strata respectively characterized by having different inherent vibration periods or natural frequencies, these different frequencies co-existing in the same pad but in different layers. It is desired to make these deflection rates capable of being predetermined in advance and subject to control by the composition and method of manufacture, to adapt these pads to the damping of vibrations of many different frequencies and amplitudes. It is also an aim to make the structure in a single simple operation, for economy of manufacture, though the structure is heterogeneous in composition and comprises two or more essentially different vibration-absorbing media.

To these ends, the invention method consists essentially in placing one or more layers or pads of sisal, jute, glass fiber or other fibers, sized with a plastisol dispersion of vinyl chloride mixed with plasticizing oil, between two layers or pads of glass fiber containing no plastisol, and applying plates coated with a plastisol composed of a lesser proportion of vinyl chloride to plasticizer than that of the intermediate layers, to the exposed top and bottom surfaces of the plastic-free glass fiber, then heating these plates to polymerize the plastisol thereon, thereafter applying pressure to force and embed the glass fiber layers therein and thus permit the heat to pass through the glass fiber layers to the sized middle layers of sisal or other fibers where it decomposes an ingredient in the plastisol sizing which forms a gas that forces this plastisol to permeate the middle layers. The polymerized state of the layers of plastisol in which the glass fiber is embedded prevents the intrusion into the latter of the plastisol of different composition forced into the sisal layers, which is in turn polymerized by the heat, and after further compression and cooling the resulting pad has two or more different and distinct layers or strata each with different natural periods of vibration or frequency responses. One layer damps out and thus checks the transmission of substantially all except its own frequency, while another layer damps out the frequency thus transmitted by the first layer. The mechanical energy of vibration is thus transformed into heat energy, and dissipated by the pad.

Control of the natural vibration period or deflection or compression rate of the individual layers is effected by varying the ratio of fiber to the polyvinyl resin in each layer, or by varying the relative hardness of the respective layers by changing the proportion of vinyl resin to plasticizer, or by varying the amount of plastisol put into the respective layers, or in other manner.

Other objects of the invention, and the manner of their attainment, are as set forth hereinafter.

An illustrative embodiment of the invention is shown in the accompanying drawings, in which FIG. 1 shows in vertical transverse section the component layers of different materials arranged in superposed relation in a heated press in readiness to be compressed into a pad.

FIG. 2 is a fragmentary view of one surface of the pad produced as shown in FIG. 1.

FIG. 3 is a cross-section on line 3—3 of FIG. 2.

The term "plastisol" is used herein in the sense recognized in the art and as described in Modern Plastics Encyclopedia, September 1957 (pages 165, 166), to designate a dispersion of finely divided vinyl resin a liquid plasticizer in which the resin particles are substantially insoluble at room temperature. The size of the resin particles averages about 0.1 to 2.0 microns, as distinguished from the much higher particle size of general purpose vinyl resins.

To make the improved vibration-absorbing material or pad, a paste of vinyl plastisol compound 1 composed of vinyl chloride resin dispersed in a suitable plasticizing oil, with added heat stabilizers, and colorants if desired, is spread by trowel or otherwise over the surface of two metal plates 3 which are formed with part-spherical protuberances 5 disposed in closely-spaced relation over one entire surface of each plate. Preferably the plates are warm at the time of application of the plastisol, so that heating of the latter starts during this application. The thickness of the coating of plastisol is such as to cover the protuberances 5 to a depth of about ⅛ inch.

A dry unsized unimpregnated mat 7 of glass fiber, either woven, needled onto a woven glass fiber scrim, or with the fibers merely assembled in bat form, is then laid lightly on the surface of the plastisol 1 covering each plate 3.

Next, an unimpregnated layer of sisal, jute, glass fiber, or other preferred fibers 9, which may be in the form of a bat of fibers disposed at random, or a needled bat with or without a woven backing, is sized by roller or spray on one side only with a thin application of vinyl chloride resin plastisol 11 containing any one or more of well known heat-decomposable chemicals such as ammonium bicarbonate, ammonium carbonate, or alternately merely water. Two layers 9 thus prepared are placed on the glass fiber layer 7 overlying one plate 3 and its applied plastisol layer 1, with the coatings 11 of sizing upward. These layers 9 may be of the same or unlike weight and composition. The lower one is sized with a double coating of plastisol.

The two assemblages on the respective plates 3 are then brought together in registering relation by inverting the one without the other upon the other and inserting the whole in a suitable press, of which the platens 13 are heated, as by electrical resistance heating units 15 therein.

Between the platens 13 at each side of the whole assemblage of plates 3 and layers 1, 7, 9, 11, spacers 17, 19 and 21 are stacked up to limit the initial closing of the platens upon the assemblage to such interval that no pressure is applied to the assemblage beyond that incidental to bringing the top platen 13 into heat-transmitting contact with top plate 3. In this way heat is transmitted from the two platens 13 to the two plates 3 and thereby to the outside layers 1 of plastisol for a period and to a degree sufficient to polymerize thoroughly the layer 1 of plastisol on each plate 3. During this heat-curing, the adjacent layers 7 of dry and unimpregnated glass fiber are uncompressed and act as barriers both against intermingling of plastisol and also against flow of heat from layers 1 into the middle layers 9 with their coatings 11.

While the polymerized plastisol layers 1 are still soft and plastic, the uppermost spacers 17 at each side of the assemblage is removed, and the press is tightened until the top platen rests on the middle spacers 19. This step has a dual purpose and effect, first to force the glass fiber of layers 7 into the soft vinyl chloride sheets 1 without disturbing their sheet formation, so as to serve as reenforcement thereof when the pad is in use. The second purpose is to end the action of glass fiber layers 7 as heat barriers, and allow the heat from the platens 13 to pass into the sized middle layers 9 of sisal or other fibers, but only after the polymerization of the layers 1 has occurred.

When the heat reaches these layers 9 it decomposes the "blowing" chemical in the sizing coats 11 on layers 9, the resulting gas pressure forcing the vinyl plastisol of layers 11 into the middle layers 9 of sisal and dispersing it uniformly throughout these layers. This implosion and consequent dispersion is successful due to the sealed barriers created by the polymerized plastisol of layers 1 with glass fiber layers 7 embedded therein. By this method, the amount of plastisol put into the middle layers 9 is subject to accurate control. The blowing chemical or substance serves as a directing force disseminating the plastisol into the fibers without creating a sponge thereof.

When the fusion of plastisol sizing 11 and the dispersion thereof throughout layers 9 is completed, the second spacer 19 at each side is removed, with accompanying release and escape of the gases in layers 9, and the press is again tightened to bring top platen 13 onto spacers 21 to effect high compression of the assemblage of fibers and plastisol layers, and determine the final thickness of the pad. In this way the desired density is imparted to the middle layers 9 of sisal or other fiber without forcing them into the top and bottom layers now composed respectively of the plastisol layer 1 with the fibers of original layers 7 embedded therein. The layers are of course bonded together by the plastic, and the whole assemblage is thus permanently combined into a pad of unitary structure in which the characteristics of its central portion are different and distinct from those of its outer portions, without any appreciable transition zone between them partaking of the character of both.

After sufficient time has elapsed for the curing of the middle layers under heat and the said pressure, cooling of the pad is effected by chilling the platens with maintenance of the high pressure until the pad has cooled sufficiently to handle, whereupon it is removed from the presses completed and ready to be cut up into pieces of any desired size, for use.

As a specific example, to make a pad for use under a machine to isolate the vibration of that machine as well as to prevent re-transmission from other machines in the vicinity, the plastisol mix to be cast on the knobbed plates 3 will consist of one part vinyl chloride resin to 1¼ parts of liquid plasticizer, properly mixed or dispersed, with colorants added if desired, as well as stabilizers preventing subsequent decomposition of the plastisol under heat. Suitable stabilizers include salts of barium, cadmium, tin, and lead, in quantities up to 5% of the weight of resin. The layer of plastisol will cover the protuberances to a depth of ⅛ inch, as previously noted.

The unsized glass fiber layers laid on the plastisol will have a weight of 4 ozs. per sq. foot.

The inmost layers will be of sisal, needled or otherwise, the upper one thereof being of a weight of 3.5 ozs. per sq. foot and the other 2.5 ozs. per sq. foot. The coating used for sizing one surface only of each of these sisal layers comprises 3½ parts of vinyl chloride resin mixed with one part of plasticizer. Water to the amount of 15% of the plastisol is also applied to the surface of the sisal layers, for conversion into steam under heat, to drive the mix into the sisal layers. Suitable colorants and stabilizers such as already named will preferably be used in the sisal layers also.

If the glass fiber is used for the middle layers instead of sisal, 6% of ammonium bicarbonate (by weight of the plastisol) is used to decompose under heat and force the mix into the middle layers of glass fiber.

The procedure of curing the pad under heat and pressure is as already described.

Thus contrived, the outer layers of plastisol with embedded glass fiber are relatively soft and thus will check or damp low frequency vibrations, while the harder middle layers of sisal (or alternatively of glass fiber), having a higher resin content, will damp out the higher frequency vibrations.

To prevent slipping of the feet or base of the supported machine on the pad, or of the pad along the floor, the pad of the McDermott patent is provided with a reticulated surface of raised ribs with depressions between, which act somewhat after the manner of suction cups to prevent relative movement of the co-engaging surfaces, this in addition to the high coefficient of friction inherent in the vinyl plastic. However, vinyl plastisol is subject to cold flow under pressure, and when the raised portions of the pad's load-supporting surfaces are made as in the patent by extrusion they are composed of practically pure vinyl plastic with the exclusion of all strengthening and reenforcing fibers of the glass fiber or other material incorporated in the underlying portions of this surfacing material. As a result, a heavy machine will in many instances be thrown out of level, and improperly supported, by this flow or shifting of the plastic and resulting change in the effective thickness of the pad. Also, the vibration of the machine often tears the ribs off of the pad.

To remedy this, the invention method produces a pad with essentially flat and parallel top and bottom surfaces, with indentations 51 pressed into the plastic, with the stiffening and reenforcing fibers embedded in the plastic clear to the top and bottom surfaces of the pad, and with double the density of reenforcing fibers in the material underlying the depressions 51. Thus the entire thickness of the pad is stabilized by the fibers against cold flow, and the formation of the non-skid surfaces by indentations instead of by embossed protrusions leaves the parallel top and bottom surfaces undisturbed.

It is desirable, as indicated above, to produce a material for these purposes having a high coefficient of friction, so that it needs no bolts or adhesives but holds the machine in place by its frictional resistance alone. For this purpose, a flexible surface is needed, to engage the floor and the foot or base of the machine. Yet this same machine by reason of its weight or violent action may require a material that has high innate strength. The novel pad meets these requirements that a part of the thickness of the pad be strong and rigid, but that no portion having this character shall extend through the outer flexible surfaces. In the example, the breaking strength of the outer layers will be around 7500 p.s.i., while the center portion will have a strength of around 27,000 p.s.i. Thus the initial thickness as well as the vibration damping properties are preserved by reason of its dimensional stability.

By means of the invention method vibration-absorbing units may be made of many and varied formulations for many different types of vibration problems such as light machines, slow to fast moving; medium weight machines, slow to fast moving; heavy machines, slow to fast moving; impact type machines, slow to fast moving; machines with high amplitude but low frequency of vibration; and machines of low amplitude but high frequency of vibration. No one composition of pad will serve to damp the varied vibrations produced by these different machines. But by varying the ratio of plasticizer to resin, of fiber to plastisol, or of the amount of plastisol put into the respective layers, the pad may be varied in consistency from extreme flexibility to extreme rigidity. Other qualities such as resistance to low and high temperature, to fire, water and chemicals can be imparted, in accordance with known compounding procedures.

It is of course contemplated to make the two outside layers of plastisol dispersion of different composition, if desired, as by using different grades or amounts of vinyl resin, or different types of plasticizer, so as to give different coefficients of friction for use on wood, metal, cement, and other surfaces. Likewise for different purposes the number of layers of fiber and the composition thereof will be varied.

While I have illustrated and described a certain form and manner in which the invention may be embodied, I am aware that many modifications may be made therein by any person skilled in the art, without departing from the scope of the invention as expressed in the claims.

The aforesaid use of a blowing agent to force resinous material into fibrous material is being claimed in continuation-in-part Ser. No. 202,487, filed June 14, 1962.

Therefore, I do not wish to be limited to the particular form and manner shown, or to the details of construction thereof, but what I do claim is:

1. The method of making vibration absorbing material which includes the steps of superposing a plurality of layers of fibrous material and a plurality of layers of plastisol, at least one plastisol layer being disposed intermediate two adjacent fibrous layers and at least one plastisol layer being disposed exteriorly of one of said adjacent fibrous layers, said plastisol comprising a dispersion of a finely divided vinyl resin in liquid plasticizer, the ratio of resin to plasticizer in said intermediate plastisol layer being different from the ratio of resin to plasticizer in said exterior plastisol layer, polymerizing by heat said exterior plastisol layer and forcing by mechanical pressure the fibers of said one fibrous layer into said exterior layer while the latter is still soft and plastic, and thereafter polymerizing by heat the intermediate plastisol layer while forcing the same into the adjacent fibrous layers to form a unitary structure having strata of differing natural frequencies of vibration.

2. The method of claim 1 in which the fibers are distributed throughout substantially the entire thickness of the material.

3. The method of claim 1 in which the plastisol of the intermediate plastisol layer is dispersed into the adjacent fibrous layers by gas pressure generated after the exterior plastisol layer has been polymerized.

4. The method of claim 1 in which the weight of the fibrous layers is different in different layers.

5. The method of claim 1 in which at least four layers of fibrous material are superposed, with one plastisol layer between an outer and an adjacent inner fibrous layer and another plastisol layer between two adjacent inner fibrous layers.

6. The method of claim 1 in which the amount of plastisol in the respective layers is different in different layers.

7. The method of making vibration absorbing material which includes the steps of placing at least one layer of fibrous material sized with a plastisol comprising a dispersion of vinyl chloride in a plasticizing oil, between two layers of fibrous material, and applying plates coated with a plastisol comprising a dispersion in a plasticizing oil of a lesser proportion of vinyl chloride than in said previously mentioned plastisol to the exposed top and bottom surfaces respectively of the two outer layers of fibrous material, then heating the plates to polymerize the plastisol thereon, thereafter applying pressure to force and embed said outer fibrous layers in the plastisol thus polymerized while the same is still soft, the heat of the plastisol then passing to the sized layer of fibrous material, the latter having a substance decomposed by such heat to form a gas forcing the plastisol throughout such layer, the heat then polymerizing this plastisol in turn, the pressure being progressively increased to compress the assembled layers and maintained while the same are cooled, whereby the material has at least two different layers each with different natural frequencies of vibration.

8. A vibration checking pad composed of a plurality of layers of fibers bonded together and permeated throughout with polymerized plastisol, said plastisol comprising finely divided vinyl resin dispersed in liquid plasticizer, the weight ratio of resin to plasticizer in the plastisol being different in one portion of the thickness of the pad from the weight ratio of resin to plasticizer in the plastisol in an adjacent portion of the thickness of the pad to provide a heterogeneous structure having strata of differing natural frequencies of vibration.

9. A vibration checking pad according to claim 8 wherein one of said strata is relatively rigid and has a breaking strength substantially four times the breaking strength of another of said strata.

10. A vibration checking pad according to claim 8 having flat and parallel exterior surfaces characterized by rounded depressions distributed throughout the surfaces.

References Cited in the file of this patent

UNITED STATES PATENTS

| | | |
|---|---|---|
| 1,461,337 | Weiss | July 10, 1923 |
| 1,644,652 | Kirschbraun | Oct. 4, 1927 |
| 1,942,251 | Mains | Jan. 2, 1934 |
| 2,456,093 | Swedlow | Dec. 14, 1948 |
| 2,530,441 | Reinhardt et al. | Nov. 21, 1950 |
| 2,772,196 | Pooley | Nov. 27, 1956 |
| 2,795,524 | Rodman | June 11, 1957 |
| 2,809,145 | McDermott | Oct. 8, 1957 |
| 2,879,197 | Muskat et al. | Mar. 24, 1959 |
| 2,894,855 | Wilhelm et al. | July 14, 1959 |

UNITED STATES PATENT OFFICE
CERTIFICATE OF CORRECTION

Patent No. 3,050,426                            August 21, 1962

John Murray Stevens

It is hereby certified that error appears in the above numbered patent requiring correction and that the said Letters Patent should read as corrected below.

In the grant, lines 2 and 3, for "assignor to H. F. Livermore Corporation, of Allston, Massachusetts, a corporation of Delaware," read -- assignor, by mesne assignments, to Lowell Industries, Inc., of Allston, Massachusetts, a corporation of Massachusetts, --; line 12, for "H. F. Livermore Corporation, its successors" read -- Lowell Industries, Inc., its successors --; in the heading to the printed specification, lines 4 to 6, for "assignor to H. F. Livermore Corporation, Allston, Mass., a corporation of Delaware" read -- assignor, by mesne assignments, to Lowell Industries, Inc., Allston, Mass., a corporation of Massachusetts --.

Signed and sealed this 1st day of January 1963.

(SEAL)
Attest:

ERNEST W. SWIDER                                        DAVID L. LADD
Attesting Officer                                           Commissioner of Patents